Patented Dec. 2, 1930

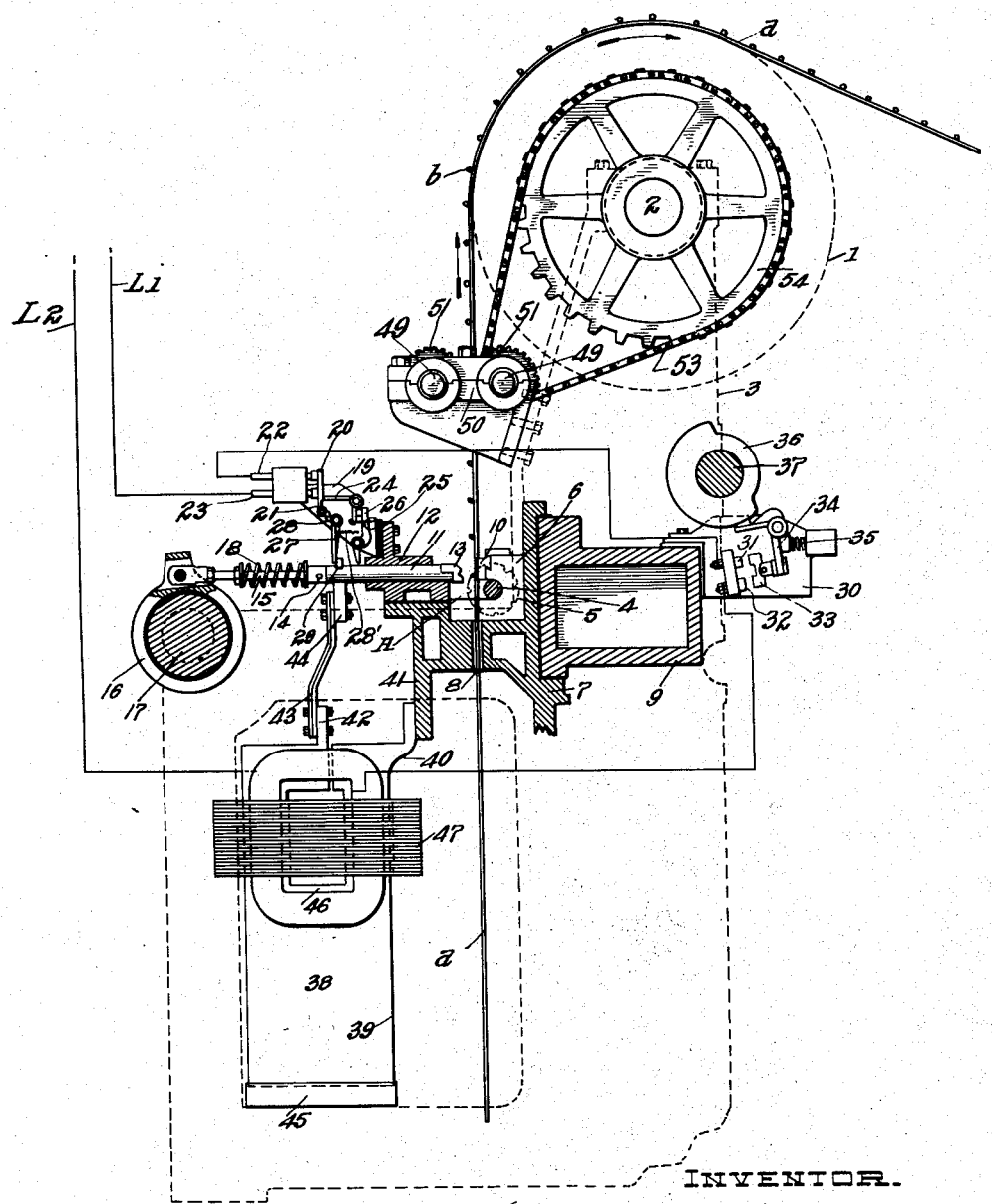

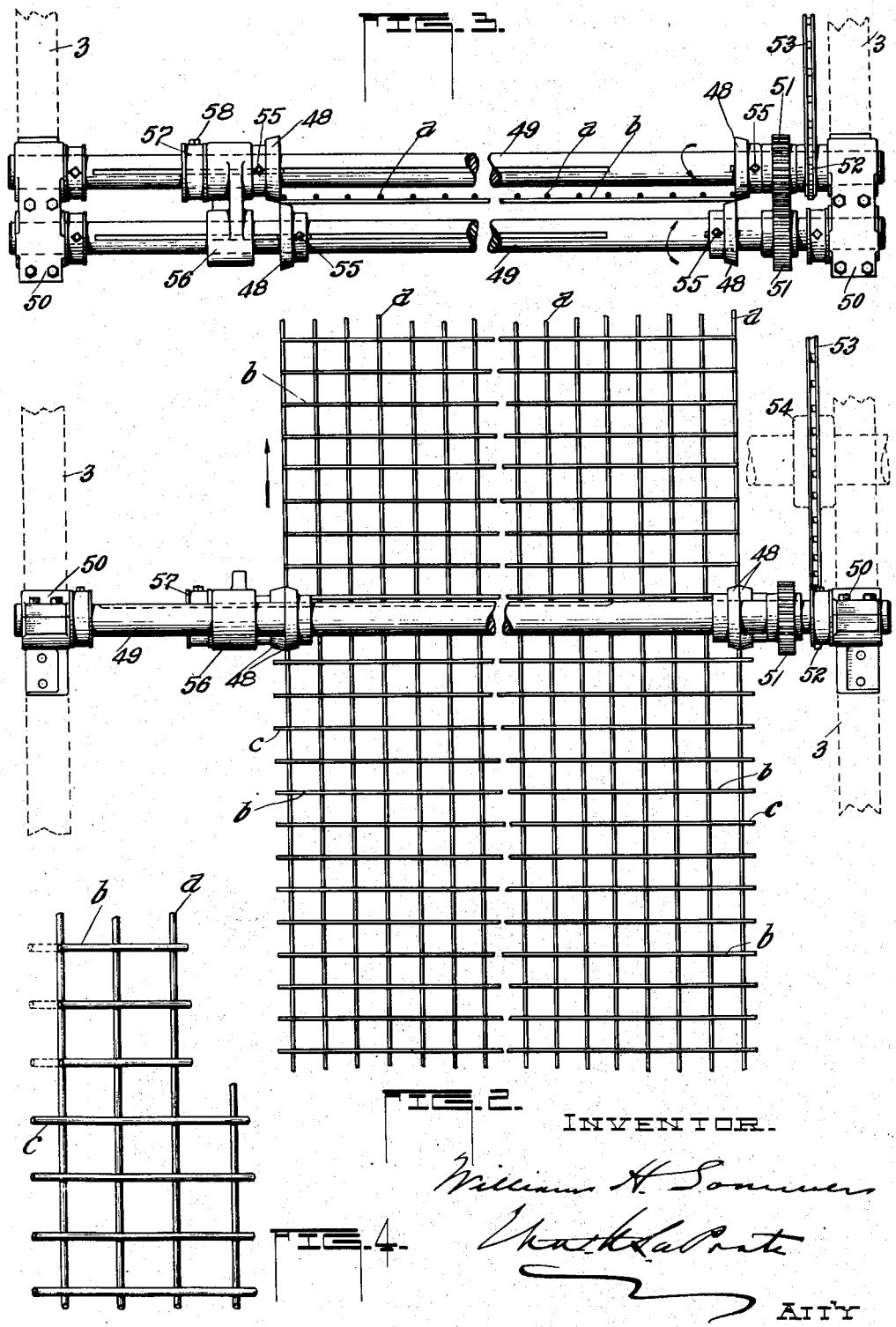

1,783,944

UNITED STATES PATENT OFFICE

WILLIAM H. SOMMER, OF PEORIA, ILLINOIS

MACHINE FOR MAKING WELDED REENFORCING FABRICS

Application filed May 11, 1928. Serial No. 276,951.

This invention has reference to machines for making welded fabrics; i. e.—wire fabrics composed of longitudinal wires and cross or transverse wires which are welded together where the cross or transverse wires intersect the longitudinal wires. Such fabrics are more particularly used for reenforcing concrete material.

The invention has for its principal object to provide for fabric welding machines, cutter mechanism for trimming off the projecting ends of the cross or transverse wires after welding action, preferably flush with the outside or marginal longitudinal wires, so that the finished fabric whether in rolls or flats, has no projecting ends beyond the outside or marginal longitudinal wires and, therefore, the lacerating of the bodies of persons handling the fabric and the tearing of their garments is entirely obviated; likewise the catching of the otherwise projecting ends of the cross or transverse wires in various objects resulting in tearing apart such cross or transverse wires from the outside or marginal longitudinal wires is entirely prevented and the finished fabric thereby more conveniently and expeditiously handled.

Other and various objects will more fully appear in the description of the machine.

That the invention may be more fully understood reference is had to the accompanying drawings forming a part of the description, illustrating a preferred embodiment of the invention, in which:—

Fig. 1 is a vertical sectional view thru a fabric welding machine embodying my invention, certain of the frame parts being shown in dotted lines;

Fig. 2 is a front elevation of the cutter mechanism and supports therefor, partly broken away, also the fabric before and after the projecting ends of the transverse wires have been cut off;

Fig. 3 is a plan view of what is shown in Fig. 2, and

Fig. 4 is a perspective view of a section of the completed fabric just prior to and after the projecting ends of the transverse wires have been cut off.

Like characters of reference denote corresponding parts thruout the figures.

While the present invention relates more particularly to the application of a cutter mechanism to a machine for the manufacture of welded wire fabrics, and is so associated with the welding means and operating in timed relation thereto and to the takeoff of the finished fabric as to progressively and successively cut off the projecting ends of the transverse wires next adjacent to or flush with the outside or marginal longitudinal wires, I have shown and will describe enough of a fabric welding machine and the application of the cutter mechanism thereto that those skilled in the art may better understand the invention. The welding machine described herein forms the subject matter of an application filed by me in the United States Patent Office June 30, 1927, bearing Serial No. 202,584, now Patent No. 1,715,794, dated June 4, 1929.

Referring to the drawings, the longitudinal wires are designated $a$ and the transverse wires $b$. It will be understood that there are fed a plurality of such wires $a$, which are preferably spaced equidistant from each other at whatever distances are desired and practical in the finished fabric, as for instance, two inches, four inches, etc. The wires $b$ are fed at suitable intervals to be spaced from each other at whatever distances are desired and such wires $b$ welded to each of the wires $a$ where they cross and intersect such wires.

It is the practice and has been, in the art, in the manufacture of welded fabrics, used for reinforcing, to feed the transverse wires $b$ across the longitudinal wires $a$ to a point, before severing a transverse wire length from the feed wire, so that ends $c$ project beyond the outside or marginal longitudinal wires $a$. These projecting ends have proven very objectionable when handling the fabric, which is sometimes furnished in rolls, also in flats, depending on how to be used. Such projecting ends $c$ become bent, thru handling, and prevent the fabric from lying flat in or against material to be reenforced and necessitates straightening, which is costly and laborious. Furthermore, these projecting ends lacerate the bodies of persons handling the fabric, doing considerable damage, which is dangerous, as well as tearing the garments of the handlers; also these projecting ends $c$ get caught in various objects, retarding and delaying the work, resulting not only in bending such ends requiring straightening, but frequently causing a tearing apart or separation of the transverse wires from the longitudinal wires, making handling inconvenient and requiring the straightening out of the wires and fabric before placement for reinforcing. It is the practice to weld only sufficiently to make a union between the longitudinal and transverse wires, such as to hold the fabric together and it is, therefore, obvious that any undue strain, such as could be exerted on the projecting ends $c$ will bend the ends and require straightening or tear the fabric apart and weaken reinforcement work at points of such unequal placement of the elements constituting the fabric.

It has not been found practicable to feed only a sufficient amount of transverse wire length $b$ to reach from one outside or marginal longitudinal wire $a$ to the other such outside or marginal wire $a$. In high speed machines of this character, it is difficult to regulate the transverse wire lengths $b$ so that each successive feeding of a wire will be of the same length, as the preceding wire. They my be shorter or longer, due to irregularities in the wire or causes resulting from imperfect operations of the feeding mechanism, which, while such operations can be checked from time to time, it is not possible to prevent errors from creeping into such operations. On the other hand, were it possible to feed regular and corresponding lengths of transverse wires $b$ across the series of longitudinal wires $a$, with the ends of each wire $b$ flush with the marginal wires $a$, the fusing of the ends of the cross wires $b$ with the bodies of the marginal wires $a$ would be faulty and a good union practically impossible, and it is therefore, desirable to provide longer lengths of cross wires $b$ than are necessary and subsequently sever the projecting ends $c$ flush with the marginal wires $a$. In order to obtain a good weld or union at the intersections of the wires $b$ with the marginal wires $a$, there should be an equal amount or area of contact of the respective welding dies on each of the wires $a$ and $b$. If this is not obtained there is a tendency for one wire to get a less amount of heat than the other wire, resulting in one wire fusing more rapidly than the other wire and due to this uneven temperature of the two wires there will be a tendency for the unmelted portion of one wire to indent itself into the other wire, tripping the control switch without the two wires fusing together.

Referring more particularly to a machine for producing the fabric and to the cutter mechanism for severing the projecting ends $c$ from the cross-wires $b$, the pull out drum or clamp for the wires $a$ is designated 1, shown only diagrammatically by dotted lines and carried by a shaft 2 journaled in side frames 3, also shown diagrammatically in dotted lines. Such wires are fed from reels or drums, not shown. The wires $b$ are fed cross-wise of wires $a$ from any suitable supply and by feeding means, not shown. Such wires $b$ being fed longitudinally of an intermittently rotated feed shaft 4 and deposited in grooves of shifter rolls 5 on the shaft 4, there being preferably a plurality of such rolls, one between each of the wires $a$. The position of feeding in the wire $b$ is designated at A and from such position the same are fed by the rolls 5 to the welded position shown. The shaft 4 is journaled in bearings 6 on the face of castings 7, which are preferably copper. There is one casting for each of the wires $a$ and each is provided with a vertically disposed guide 8 through which a wire $a$ is fed or pulled by the pull out clamp or drum 1. Said castings are supported or carried by a bed frame 9, preferably of cast iron, and said bed is supported by the side frames 3 to which it is secured. The wires $a$ pass up and in front of die members 10, one secured to each of the bearing members 6. In operation, the shifting rolls 5 move the wires $b$ from the feeding in position A to the welding position in front of the die members 10.

Arranged to cooperate with each die member 10 is a reciprocal bar 11, movable in journals 12 supported by and insulated from the respective castings 7 and to the acting end of each bar is connected a die member 13 adapted to coact with the intersections of wires $a$ and $b$ and with a die member 10 during a welding operation. Slidably connected at 14 with each bar 11 is a rod 15 and each rod is pivotally connected with a strap 16 connected to and insulated from a rocker shaft 17 and said shaft is journaled in the side frame 3 and connected with means, not shown, for alternately rocking said shaft in opposite directions to reciprocate the bars 11 toward and from the dies 10. The forward movement of the bars 11 positioning the dies 13 in relation to the dies 10 and the intersections of the wires $a$ and $b$ to weld the latter together. A spring 18 is coiled on each rod 15 and so arranged that during the initial forward movement or thrust of the bars 11, said springs are compressed. Such initial movement causes the dies 13 to contact with the wires $a$ and $b$ and grip the same with the dies 10; then upon electricity flowing thru such dies to heat the wires $a$ and $b$, causing a welding of the same, said springs 18 expand forcing the dies 13 to move slightly further forward with the welding of said wires. The bars 11, during their forward and return movements, coact with switch controlling means, as I shall now describe.

There is a switch bracket 19 connected to and insulated from each bearing 12 and said brackets support suitable switches and controlling means, as follows:—20 is a pivotally supported switch arm having a finger 21, and said arm is arranged for contact with contact rods 22 and 23, the former being held stationary, while the latter is normally spring pressed forwardly, altho such means is not shown. Coacting with said switch arm 20 is a pivotally supported bell-crank arm 24, normally held in locking position against the arm 20 by means of a spring 25. And adapted to act against said bell-crank arm 24 is a pivotally supported lever arm 26. There is also provided a pivotally supported operating arm 27 having a finger 28 adapted to engage with the finger 21 on the switch arm 20 and said arm 27 is normally held in operative position by a spring 28'. This latter arm 27 is adapted to be operated upon by a lug 29 carried by the bar 11, which said lug is also adapted to engage with the arm 26. The operation of the switch arms 20, in their relation to the rods 22 and 23, the controlling means, consisting of the arms 24, 26 and 27 and the lugs 29 on the bars 11, will be more clearly explained as the welding operation is described.

Other switch means and control therefor, comprises a series of switch brackets 30, one to correspond to each bracket 19; the former being positioned forward of the bed 9 and the latter being positioned in the rear thereof and supported thereby. Contact members 31 and 32 are connected with the bracket 30. The former is connected in a circuit L1 with the rod 22 with which the switch arm 20 engages and the latter is in a circuit with the primary windings of a transformer, to be described. Adapted to have engagement with the contacts 31 and 32 is a contact member 33 connected to and insulated from a pivoted bell-crank arm 34 which is under normal action of a spring 35. One end of said bell-crank arm 34 is caused to ride on a cam member 36 carried by a rotating shaft 37 journaled in suitable bearings, not shown, on the side frames 3. This shaft may be rotated in any suitable manner, and the cams 36 thereon, of which there is one corresponding to each bar 11, and said shaft 37, the shaft 4 and the shaft 17 are operated in timed relation to each other to accomplish the closing of electrical circuits at the time of placing the wires $b$ in position to be welded to the wires $a$, and the movement of the bars 11 into position for such welding. The cams 36, during a partial revolution hold the arms 34 so as to separate the contact 33 from the contacts 31 and 32 and during the remainder of the rotation of said cams 36, the arms 34 are released, permitting the springs 35 to act to force the contact 33 into engagement with the contacts 31 and 32.

There is provided a transformer, which I have designated 38, for each welding unit, comprising the bars 11 and their dies 13, and the coacting die members 10. Each transformer includes a secondary winding 39, one terminal 40 of which is connected to a rigid binding post 41 on a casting 7, and the other terminal 42 of which is connected to a flexible lead 43, in turn connected to a post or lug 44 on a bar 11. The several secondary windings may be supported by a filler block 45, of insulating material, or each such winding may be supported by an individual block. The primary winding, is preferably two coils 46, one on each side of the secondary winding, and said secondary and primary windings are embraced by the laminated iron core 47. By reference to Fig. 1, it will be seen that circuit L1 connects the contact member 32 with one of the coils of the primary winding with a jumper between the two said coils and the circuit L2 is connected with the other of such coils. With the switch 20 in contact with the rods 22 and 23, and the contact 33 engaging the contacts 31 and 32, while at the same time the dies 13 and 10 are in contact with cross-wires $a$ and $b$, it will be obvious, without further detailed description how the electrical current flows thru the circuit L1 from the rod 23 to the rod 22, thence thru the contacts 31, 33 and 32 to and thru the transformers and to and thru the dies 10 and 13 heating the cross-wires $a$ and $b$ and causing a welding action between the two, and the current flowing to and thru the circuit L2.

The cutter mechanism and support therefor are best seen in Figs. 2 and 3, while in Fig. 1 the means for operating the cutter mechanism is shown. I have elected, in the form shown, to locate the cutter mechanism between the welding dies 10 and 13 and the pull out drum or clamp 1 and to operate the cutter mechanism from the shaft 2; but it is to be understood that the severing of the projecting ends $c$ of the cross-wires $b$ may take place at some other convenient point, as for instance, after the fabric leaves the pull out drum or clamp 1 and operate the cutter mechanism from the shaft 2 or other power transmitting means of the machine.

The cutters include the sets of coacting rotatable cutting discs 48, 48, which are carried by and rotate with the pair of parallel spaced shafts 49, 49, journaled in suitable bearings 50 secured to and supported by the side frames 3. These shafts are geared together by the gears 51, 51, whereby they rotate in opposite directions and one of said shafts 49 is provided with a sprocket pinion 52 engaged and driven by a sprocket chain 53 receiving its power from a sprocket wheel 54 carried by and receiving its power from the shaft 2. One set of cutters 48, 48 have preferably a spline and groove connection with the shafts 49, 49, see Figs. 2 and 3, whereby they may be adjusted longitudinally on the shafts 49, 49 to adapt the cutter mechanism to varying widths of the fabric and varying lengths of cross-wires b and when adjusted all cutters are fixed in position by means of set screws 55. In association with the slidable and adjustable cutters is a slidable bearing 56, adapted to be held in adjusted positions by means of a collar 57 and set screw 58. The shafts 49, 49 are supported in a suitable position above the dies 10 and 13, see Fig. 1, and it is between these shafts that the fabric is led from the welding instrumentalities up and over the pull out drum or clamp, as shown. The cutters being adjusted to the width of the fabric being manufactured and the cross-wires b being attached, by welding, to the longitudinal wires a, leaving exposed the projecting ends c, see Fig. 2, such projecting ends c of the respective and successive cross-wires b, as they are brought into co-incidence with the pairs of cutters 48, 48, are progressively and successively severed from the cross-wires b flush with the outside or marginal wires a. The original and subsequent conditions of the cross-wires b are best seen in Fig. 2, wherein is illustrated the welding of cross-wires with projecting ends c and such projecting ends severed from the length of such cross wires leaving the marginal edges of the fabric smooth and free of any projections.

In the operation of the machine, assuming that a transverse wire b has been moved into position cross-wise of the wires a and in front of the die members 10, the oscillatory shaft 17 will move the bars 11 forwardly so as to bring their die members 13 into engagement with the cross-wire a and b and together with the dies 10 hold such wires therebetween ready for the welding action. The forward movement of the bars 11 will remove the lugs 29 thereon releasing the operating levers 27 so that the springs 28 will move said levers 27 from engaging position with the switch lever 20 and this initial forward movement of the bars 11 will position the lugs 29 thereon immediately in front of but not quite engaging the levers 26, while at the same time the springs 18 will be compressed. In this position of the parts with the lever 24 holding the switch arm 20 against the rods 22 and 23, electrical current can only flow through the circuit L1 and to the die members for welding, providing a contact is made between the members 33, 31 and 32, and it is at this time that the shaft 37 moves the cam members 36 from off of the arms 34 to permit the springs 35 to act to cause a contact between the members 33, 31 and 32 to close the circuit L1 to the transformers. Immediately on the current passing thru the connected wires a and b the metal is melted causing a welding action and at the same time as the metal melts the springs 18 which have been compressed during the initial forward movement of the bars 11, will act to cause the bars to move further forward and at the moment that the welded action has been completed the lugs 29 on the bars 11 will engage and act on the arms 26 which in turn will move the arms 24 so as to release the switch arms 20 and the spring pressed rods 23 will move said switch arms 20 so as to break the circuit between the parts 23, 20 and 22 and stop the flow of current thru the circuit L1 to the transformers and immediately following this action the cams 36 move to a position to act on the arms 34 to break the contacts between the members 33, 31 and 32 and such cycle of operations continues so long as it is desired to weld. Immediately following the breaking of the contacts 33, 31 and 32 the bars 11 are retracted and their lugs 29 engage with the operating arms 27 to return the controlling parts in association with the switch arms 20, and such switch arms, to the position shown in Fig. 1.

The pull out drum or clamp 1 rotates in timed relation with the welding mechanism, whereby to advance the longitudinal wires a for the proper positioning of the cross-wires b for welding the same to the wires a. The fabric is advanced between and guided by the shafts 49, 49 whereby to permit the cutters 48, 48 to sever the projecting ends c from the cross-wires b and such finished and trimmed fabric may be rolled in rolls or cut off in flats, as the use to which the fabric is to be put, may demand.

What I claim is:—

1. In a machine for making fabrics for reenforcing, the combination with means for connecting cross wires to a series of longitudinal wires with ends of the cross wires projecting beyond the outside or marginal longitudinal wires, of combined guide and cutter mechanism arranged and operating to guide the wires and to sever the projecting ends of such cross wires flush with the outside or marginal longitudinal wires.

2. In a machine for making fabrics for reenforcing, the combination with means for connecting cross wires to a series of longitudinal wires with ends of the cross wires projecting beyond the outside or marginal longitudinal wires, of sets of rotating cutters between which the fabric is moved and guided, the said cutters arranged and operating to engage the marginal longitudinal wires and to successively sever the projecting ends of said cross wires, whereby the terminal ends of the cross wires in the finished fabric do not project beyond the outside or marginal longitudinal wires.

3. In a machine for making fabrics for reenforcing, the combination with means for connecting cross wires to a series of longitudinal wires with ends of the cross wires projecting beyond the outside or marginal longitudinal wires, of spaced sets of cutters arranged in the path of movement of the fabric so as to engage the marginal longitudinal wires, and means to actuate said cutters whereby they are caused to progressively sever the projecting ends of the successive cross wires flush with the outside or marginal longitudinal wires.

4. In a machine for making fabrics for reenforcing, the combination with means for connecting cross wires to a series of longitudinal wires with ends of the cross wires projecting beyond the outside or marginal longitudinal wires, of a pair of spaced shafts between which the fabric is fed and guided, pairs of cutters on said shafts arranged to engage the marginal longitudinal wires and to sever the projecting ends of the successive cross wires, whereby the terminal ends of the cross wires in the finished fabric do not project beyond the outside or marginal longitudinal wires, and means to operate said shafts in unison.

5. In a machine for making fabrics for reenforcing, the combination with means for connecting cross wires to a series of longitudinal wires with ends of the cross wires projecting beyond the outside or marginal longitudinal wires, of a pair of spaced shafts between which the fabric is fed and guided, pairs of cutters on said shafts arranged to engage the marginal longitudinal wires and to sever the projecting ends of the successive cross wires, whereby the terminal ends of the cross wires in the finished fabric do not project beyond the outside or marginal longitudinal wires, one of said pairs of cutters adapted for adjustment longitudinally of said shafts to accommodate the sets of cutters to different widths of fabrics, and means to operate said shafts in unison.

6. In a machine for making fabrics for reenforcing, the combination with means for connecting cross wires to a series of longitudinal wires with ends of the cross wires projecting beyond the outside or marginal longitudinal wires, a pull out for advancing the finished fabrics after each connecting operation, of sets of rotating cutters between which the fabric is moved, the said cutters arranged and operating to engage the marginal longitudinal wires and to successively sever the projecting ends of said cross wires, whereby the terminal ends of the cross wires in the finished fabric do not project beyond the outside or marginal longitudinal wires.

7. In a machine for making fabrics for reenforcing, the combination with means for connecting cross wires to a series of longitudinal wires with ends of the cross wires projecting beyond the outside or marginal longitudinal wires, a pull out for advancing the finished fabrics after each connecting operation, a shaft for operating said pull out, of sets of rotating cutters between which the fabric is moved, the said cutters arranged and operating to engage the marginal longitudinal wires and to successively sever the projecting ends of said cross wires, whereby the terminal ends of the cross wires in the finished fabric do not project beyond the outside or marginal longitudinal wires, and means to operate said cutters from said pull out shaft.

8. In a machine for making fabrics for reenforcing, the combination with means for connecting cross wires to a series of longitudinal wires with ends of the cross wires projecting beyond the outside or marginal longitudinal wires, a pull out for advancing the fabric after each connecting operation, a shaft for operating said pull out, a pair of spaced rotating shafts disposed in advance of said pull out and in the path of the fabric and between which latter the fabric is moved, pairs of spaced coacting cutters on said shafts arranged to engage the marginal longitudinal wires to guide the fabric and to sever the projecting ends of the successive cross wires, whereby the terminal ends of the cross wires in the finished fabric do not project beyond the outside or marginal longitudinal wires, and means to operate the rotating shafts from the pull out shaft.

WILLIAM H. SOMMER.